United States Patent [19]

Dummermuth

[11] Patent Number: 5,611,228

[45] Date of Patent: Mar. 18, 1997

[54] PRESSING TOOL

[75] Inventor: Paul Dummermuth, Zunzgen, Switzerland

[73] Assignee: Pamag AG, Flums, Switzerland

[21] Appl. No.: 556,496

[22] Filed: Nov. 13, 1995

[30] Foreign Application Priority Data

Nov. 16, 1994 [CH] Switzerland .................. 03432/94

[51] Int. Cl.$^6$ .................................................. B21D 55/00

[52] U.S. Cl. ......................... 72/21.2; 72/2; 72/31.01; 72/409.14; 192/129 A; 403/27

[58] Field of Search .................. 72/1, 2, 21.2, 21.3, 72/31.01, 31.1, 31.06, 453.16, 481.2, 482.92, 409.13, 409.14, 409.16, 409.19, 712, 416; 192/129 A, 129 R, 116.5; 29/715; 173/2; 403/27, 69

[56] References Cited

U.S. PATENT DOCUMENTS

| | | | |
|---|---|---|---|
| 1,910,217 | 5/1933 | Hadfield | 192/129 A |
| 2,387,478 | 10/1945 | Tiffany | 72/2 |
| 2,533,943 | 12/1950 | Klein | 72/481.2 |
| 3,423,987 | 1/1969 | Klingler | 72/413 |
| 4,315,425 | 2/1982 | Zbornik | 72/481.2 |
| 5,040,400 | 8/1991 | Nastasi | 72/453.16 |

*Primary Examiner*—Daniel C. Crane
*Attorney, Agent, or Firm*—Weingarten, Schurgin, Gagnebin & Hayes LLP

[57] ABSTRACT

A pressing tool for coupling elements includes a forked receiver, a clamping claw which is interchangeably held in the receiver by a connecting pin, and a drive motor for the activation of the clamping claw. The connecting pin can be inserted through holes bored in the forked receiver and the clamping claw crosswise relative to the lengthwise direction of the housing of the pressing tool. A monitoring element is provided, which checks to ensure that the connecting pin is fully inserted. The monitoring element is connected to the power source of the drive motor by means of a switching element.

8 Claims, 1 Drawing Sheet

5,611,228

PRESSING TOOL

FIELD OF THE INVENTION

The present invention relates to an electric hand tool, and more particularly to a pressing tool for joining parts together.

BACKGROUND OF THE INVENTION

Pressing tools are used to compress coupling elements and thus join two parts together. Cylindrical coupling elements include, for example, pressed sleeves, pressed fittings or pipe joints, and also pipe segments which can be inserted into one another and pressed together. Pressing tools can have a pistol shape and a clamping claw. The clamping claw encloses a coupling element to be compressed. When the pressing tool is activated, the clamping claw is pressed together, which in turn compresses the coupling element. In order to permit the same pressing tool to be used with coupling elements of different diameters, the tool is configured such that clamping claws with corresponding dimensions can be easily substituted. Therefore, the pressing tool can include a forked receiver, in which the clamping claw is interchangeably attached by a connecting pin. The forked receiver and the clamping claw have bored holes for this purpose, through which the connecting pin is inserted.

Pressing tools of this type are prone to cause accidents. For example, the clamping claw has been known to fly off uncontrollably and the forked receiver is forced apart and bent. Mishaps or accidents have occurred with both electro-mechanical pressing tools as well as electro-hydraulic pressing tools. While the exact cause of these accidents is not known, it is assumed that material fatigue, manufacturing tolerances and power fluctuations were significant factors in the accidents.

An additional potential cause of the above-mentioned accidents is that the connecting pin may have been incorrectly or incompletely inserted into the forked receiver. In that case, the transverse forces that occur during the pressing operation cause the forked receiver to be spread apart, thereby allowing the clamping claw to become detached from its mounting. It is therefore important that the correct position of the connecting pin be monitored, and that the drive motor of the pressing tool be disabled should the monitor detect that the connecting pin is not completely seated within its bore.

There are other pressing tools for cylindrical coupling elements in which the connecting pin is secured by a safety element, such as a split pin. The split pin only serves to secure the connecting pin in position, and not to monitor the position of the pin within its bore. The pressing tool is also capable of operation without this safety device, so there is no real increase in operating safety. Because this type of work is usually done under time pressure, with the claws having to be changed frequently, the split pins are often not employed.

SUMMARY OF THE INVENTION

The present invention provides a pressing tool for coupling elements that is safer to operate than other pressing tools.

In a first embodiment the pressing tool has a pistol grip connected to one end of a housing, with the other end of the housing having a forked receiver for receiving a crimping claw. The crimping claw is detachably connected to the forked receiver via installation of a connecting pin into a bore extending crosswise through the forked receiver and the crimping claw. A motorized drive engages the crimping claw so that a pressing operation can be performed. A monitoring element is provided, which enables the operation of the motorized drive only if the connection pin is correctly and completely installed. The monitoring element is connected via a switching element to the power source of the drive motor.

In another embodiment, the connecting pin can only be inserted into its bore from one end, with the monitoring element situated near an opposite end of the bore.

DESCRIPTION OF THE DRAWINGS

The invention will be more fully understood from the following detailed description taken in conjunction with the accompanying drawings in which.

DETAILED DESCRIPTION OF THE INVENTION

Figure 1:
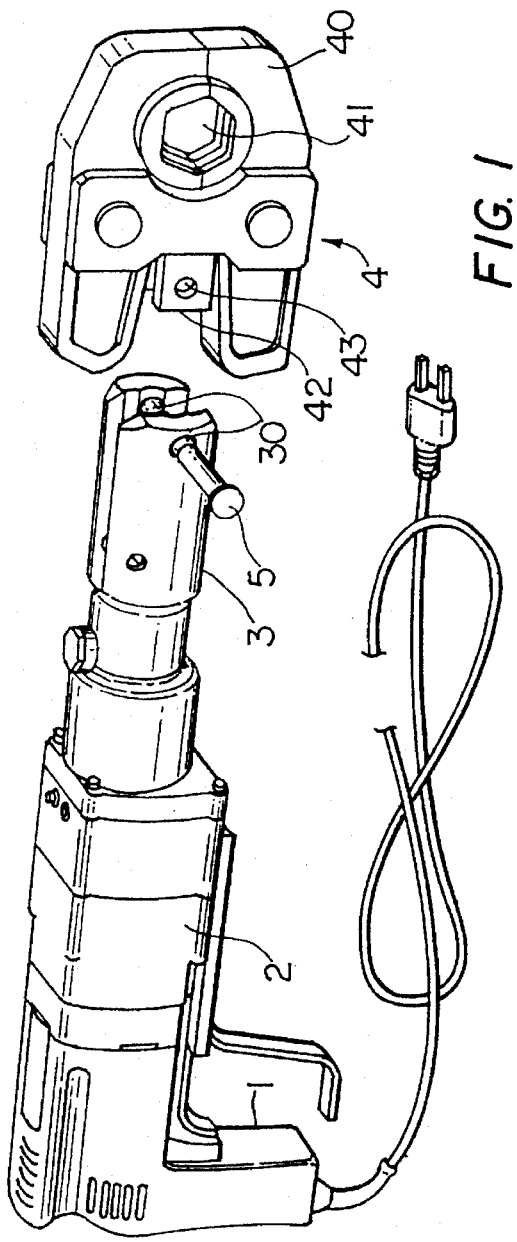
FIG. 1 is a perspective view of a pressing tool according to the invention.

A pressing tool for cylindrical coupling elements is shown in FIG. 1. The tool has a pistol shaped grip 1 at a first end of a housing 2, and a forked receiver 3 at an opposite end of the housing 2. An interchangeable clamping claw 4, having two clamping jaws 40, is detachably mounted in forked receiver 3. The clamping jaws 40 form a circular opening 41, which corresponds to the diameter of the coupling element to be pressed. The clamping claw 4 has a draw plate 42, which has a bore 43 perpendicular to the lengthwise direction of the housing 2. In the mounted state, this draw plate is enclosed by the forked receiver 3. The forked receiver has a bore 30 which is aligned with the bore 43 of the draw plate. A connecting pin 5 can be inserted through these bores for attaching the clamping claw 4 to the housing 2. A drive positioned in the housing 2 acts through a piston rod or spindle upon clamping claw 4, so that a pressing operation can be executed.

A monitoring element verifies that connecting pin 5 is completely inserted into bore 30. The monitoring element is connected via a switching element to the power source for the drive motor of the pressing tool. The drive motor can only be operated when the monitoring element has detected that the connecting pin 5 is correctly and fully inserted. Should the connecting pin 5 not be fully inserted or become loose during the operation of the pressing tool, the monitor element will disable the drive motor.

In another embodiment connecting pin 5 can only be inserted into bore 32 from one end, with the monitoring element positioned near the opposite end of bore 30. Accordingly, the drive motor can be activated only when the connecting pin is inserted correctly and completely into bore 32.

Figure 2:
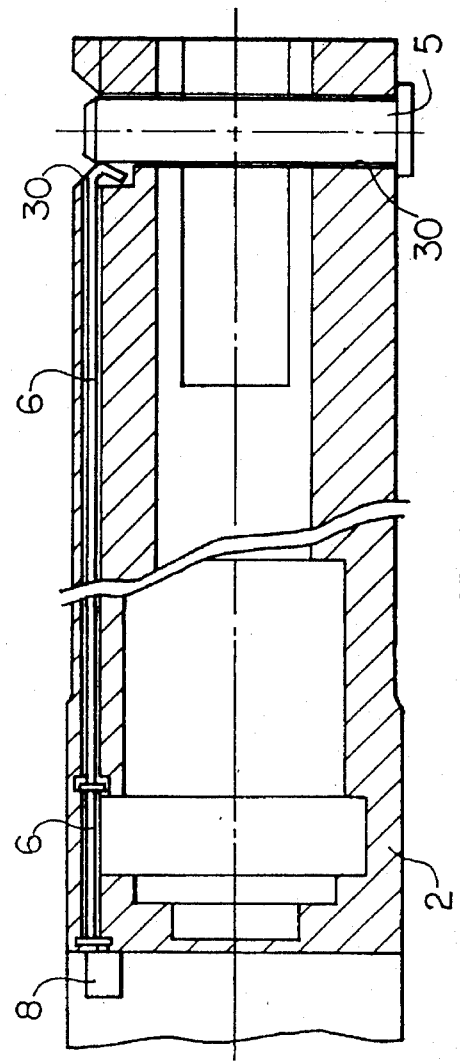
FIG. 2 is a cross section through a part of a pressing tool per one embodiment of the invention.

FIG. 2 shows another embodiment in which the monitoring element comprises a monitoring rod 6 and a microswitch 8. The monitoring rod 6 is spring loaded, and is disposed at a rear end in the housing 2 of the pressing tool, and at the front end in the region of bore 30. Arranged at the rear end of monitoring rod 6 is the microswitch 8, which is coupled to the drive motor. If connecting pin 5 is completely inserted into bore 30, the spring-loaded monitoring pin 6 will be forced backwards, overcoming the force of the spring, so that microswitch 8 closes, thus allowing the drive motor to operate. If the connecting pin 5 is not completely inserted into bore 30, the monitoring rod 6 will not engage microswitch 8, and the drive motor will be disabled. Even if connecting pin 5 is installed completely initially and then becomes unsecured during the operation of the pressing tool, the unit will be shut down.

In this embodiment the front end of the monitoring rod 6 is bent over to form an angle of slightly more than 90° relative to the axis of the connecting pin 5. Due to this angle, the connecting pin 5 can be fully inserted in only one direction. The connecting pin 5, when correctly inserted from the side opposite that of the monitoring rod 6, slides past the bent-over end and pushes the monitoring rod 6 back. If connecting pin 5 is inserted from the wrong side, the monitoring rod 6 will block connecting pin 5 from filling bore 30. This prevents a partially inserted connecting pin 5 from enabling the drive motor. An additional benefit of having a monitoring element in the form of a transmission rod 6 which imparts information on the position of the connecting pin 5 to the remote microswitch 8 is that any vibrations and shocks encountered from using the tool are damped by the transmission rod 6 and the spring, so that the susceptibility of the monitoring system to disturbances is minimized.

Figure 3:
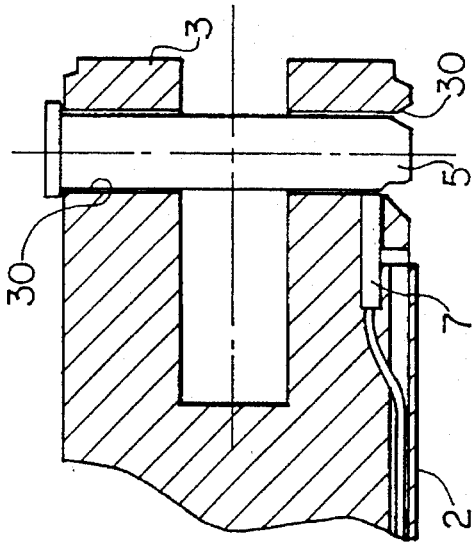
FIG. 3 is a cross section through a part of a pressing tool according to a second embodiment.

An additional embodiment is shown in FIG. 3. The monitoring element is located immediately in the zone of bore 30 of the forked receiver 3. This monitoring element is a switching element 7 such as a proximity switch or an optical sensor. The monitoring element is activated when connecting pin 5 is inserted correctly. The lower end of the connecting pin 5 has a bevel so that switching element 7 will only be activated when connecting pin 5 has been fully inserted into bore 30.

In an additional embodiment not shown here, the connecting pin 5 and bore 30 are specially shaped to ensure that connecting pin 5 can only be inserted in one direction. The connecting pin 5 is preferably given a conical shape, in which case the two ends of bore 30 have different diameters. As a result the connecting pin 5 can only be inserted from one side. Other, not necessarily symmetrical, cross-sectional shapes may also be used.

Having described preferred embodiments of the invention it will now become apparent to those of ordinary skill in the art that other embodiments may be used. Accordingly, it is submitted that the invention should not be limited to the described embodiment but rather should be limited only by the spirit and scope of the appended claims.

What is claimed is:

1. A pressing tool for coupling elements comprising:
    a pressing tool housing have a length;
    a forked receiver disposed at one end of said pressing tool housing, said forked receiver having a bore disposed perpendicular to the lengthwise direction of said housing;
    a clamping claw having a bore disposed perpendicular to the lengthwise direction of said housing;
    a connecting pin interchangeably securing said clamping claw to said forked receiver by being removeably inserted into said clamping claw bore and said forked receiver bore;
    a drive motor; and
    a monitoring element disposed in said forked receiver, said monitoring element detecting the position of said connecting pin, said monitoring element enabling said drive motor when said connecting pin is correctly positioned within said forked receiver bore and disabling said drive motor when incorrectly positioned within said forked receiver bore.

2. The pressing tool of claim 1, wherein said connecting pin can be inserted from only one side of said forked receiver.

3. The pressing tool of claim 1, wherein said monitoring element comprises:
    a transmission rod communicating at a first end with a microswitch, and
    a second end of said transmission rod extending into said forked receiver bore, wherein said transmission rod engages said microswitch if said connecting pin is correctly and completely inserted into said forked receiver bore.

4. The pressing tool of claim 3, wherein said second end of said transmission rod is bent over toward a central axis of said housing, forming an angle.

5. The pressing tool according to claim 1, wherein said monitoring element is a switching element disposed in said forked receiver bore.

6. The pressing tool of claim 1, wherein said monitoring element is a contact-free switching element.

7. The pressing tool of claim 1, wherein said monitoring element is a proximity switch, said proximity switch activated when said connecting pin is correctly positioned within said forked receiver bore, said connecting pin further having a bevel for direction-dependent insertion of said connecting pin within said forked receiver bore.

8. The pressing tool of claim 1, wherein said connecting pin has a conical shape and said forked receiver bore has a different size diameter bore at one end of said bore as compared to an opposite end of said bore.

* * * * *